US010909139B2

(12) United States Patent
Le et al.

(10) Patent No.: US 10,909,139 B2
(45) Date of Patent: Feb. 2, 2021

(54) SQL QUERY FORMATTING BY EXAMPLES

(71) Applicant: Microsoft Technology Licensing, LLC, Redmond, WA (US)

(72) Inventors: Vu Minh Le, Da Nang (VN); Gustavo Araujo Soares, Seattle, WA (US); Sumit Gulwani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 16/007,396

(22) Filed: Jun. 13, 2018

(65) Prior Publication Data
US 2019/0384851 A1     Dec. 19, 2019

(51) Int. Cl.
*G06F 16/00*     (2019.01)
*G06F 16/25*     (2019.01)
*G06F 16/242*    (2019.01)

(52) U.S. Cl.
CPC ........ *G06F 16/258* (2019.01); *G06F 16/2423* (2019.01)

(58) Field of Classification Search
CPC .. G06F 16/24528; G06F 8/30; G06F 16/2423; G06F 16/258
See application file for complete search history.

(56) References Cited

U.S. PATENT DOCUMENTS

| | | | | |
|---|---|---|---|---|
| 5,889,739 | A | * | 3/1999 | Nishimura ........ G11B 11/10508 369/13.07 |
| 7,877,731 | B2 | | 1/2011 | Bekelman |
| 2008/0250057 | A1 | * | 10/2008 | Rothstein ................ G06F 16/20 |
| 2010/0153430 | A1 | | 6/2010 | Mordvinov et al. |
| 2016/0063063 | A1 | * | 3/2016 | Tsai .................... G06F 16/2452 707/755 |

OTHER PUBLICATIONS

"Apexsql Refactor", Retrieved from «https://www.apexsql.com/sql_tools_refactor.aspx», Jan. 1, 2018, 12 Pages.
"Rfmt: A code formatter for R", Retrieved from «https://github.com/google/rfmt», Jan. 1, 2018, 1 Page.
Bagge, et al., "A Pretty Good Formatting Pipeline", In Proceedings of 6th International Conference on Software Language Engineering, Oct. 26, 2013, 20 Pages.

(Continued)

*Primary Examiner* — Cheryl Lewis
(74) *Attorney, Agent, or Firm* — Schwegman Lundberg & Woessner. P.A.

(57) ABSTRACT

Systems and techniques for structured query language (SQL) query formatting by examples are described herein. In an example, a SQL query formatter is adapted to receive a SQL statement, such that the SQL statement is formed using SQL tokens. The SQL query formatter may be further adapted to use a SQL formatter model to format the SQL statement, which results in a formatted SQL statement. The SQL formatter model may be trained using at least one previously executed SQL statement. The SQL formatter model may include format definitions for SQL tokens. The SQL query formatter may be further adapted to output the formatted SQL statement.

20 Claims, 9 Drawing Sheets

(56) References Cited

OTHER PUBLICATIONS

Brand, et al., "A Language Independent Framework for Context-Sensitive Formatting", In Proceedings of 10th European Conference on Software Maintenance and Reengineering, Mar. 22, 2006, 10 Pages.
Brand, et al., "Generation of Formatters for Context-free Languages", In Journal ACM Transactions on Software Engineering and Methodology, vol. 5, Issue 1, Jan. 1, 1996, pp. 1-41.
Coutaz, Joelle, "A Layout Abstraction for User-system Interface", In Journal of SIGCHI Bulletin, vol. 16 Issue 3, Jan. 1, 1985, pp. 18-24.
Edge, et al., "Mixed-initiative Approaches to Global Editing in Slideware", In Proceedings of the 33rd Annual ACM Conference on Human Factors in Computing Systems, Apr. 18, 2015, pp. 3503-3512.
Gulwani, Sumit, "Automating String Processing in Spreadsheets Using Input-Output Examples", In Proceedings of the 38th Annual ACM SIGPLAN-SIGACT Symposium on Principles of Programming Languages, Jan. 26, 2011, pp. 317-329.
Gulwani, et al., "Inductive Programming Meets the Real World.", In Journal of Communications of the ACM, vol. 58, Issue 11, Oct. 23, 2015, 9 Pages.
Hoffa, Felipe, "Leading with Commas—Ugly or Efficient? an Investigation over 320 gb of Sql Code", Retrieved from «https://hackernoon.com/winning-arguments-with-data-leading-with-commas-in-sql-672b3b81eac9», Jul. 26, 2017, 8 Pages.
Jokinen, Matti O., "A Language-independent Prettyprinter", In Journal of Software Practice and Experience (SPE), vol. 19, Issue 9, Sep. 1, 1989, pp. 839-856.
Jonge, Merijin, De, "Pretty-printing for Software Reengineering", In Proceedings of International Conference on Software Maintenance, Oct. 3, 2002, 10 Pages.
Holywell Simon, "Sql style guide", Retrieved from «http://www.sqlstyle.guide/», Jan. 1, 2018, 13 Pages.
Le, et al., "FlashExtract: A Framework for Data Extraction by Examples", In Proceedings of the ACM Principles of Programming Languages, vol. 49, Issue 6, Jun. 9, 2014, pp. 542-553.
Miara, et al., "Program Indentation and Comprehensibility", In Journal of Communications of the ACM, vol. 26, Issue 11, Nov. 1, 1983, pp. 861-867.
Oppen, Dereck C., "Prettyprinting", In Journal of ACM Transactions on Programming Languages and Systems, vol. 2, Issue4, Oct. 1, 1980, pp. 465-483.
Parr, et al., "Towards a Universal Code Formatter through Machine Learning", In Proceedings of the ACM SIGPLAN International Conference on Software Language Engineering, Oct. 31, 2016, pp. 137-151.
Polozov, et al., "FlashMeta: a Framework for Inductive Program Synthesis", In Proceedings of the ACM SIGPLAN International Conference on Object-Oriented Programming, Systems, Languages, and Applications, Oct. 25, 2015, pp. 107-126.
Reiss, Steven P., "Automatic Code Stylizing", In Proceedings of the Twenty-second IEEE/ACM International Conference on Automated Software Engineering, Nov. 5, 2007, pp. 74-83.
Rolim, et al.,"Learning Syntactic Program Transformations from Examples", In Proceedings of the 39th International Conference on Software Engineering, May 20, 2017, pp. 404-415.
Sheldon, Robert, "Transact-sql formatting standards (coding styles)", Retrieved from «https://www.red-gate.com/simple-talk/sql/t-sql-programming/transact-sql-formatting-standards-coding-styles/», Aug. 25, 2009, 25 Pages.
Spinellis, et al., "The Evolution of C Programming Practices: A Study of the Unix Operating System 1973-2015", In Proceedings of the 38th International Conference on Software Engineering, May 14, 2016, pp. 748-759.
Yelland, Phillip M., "A New Approach to Optimal Code Formatting", Retrieved from «https://static.googleusercontent.com/media/research.google.com/en//pubs/archive/44667.pdf» Apr. 20, 2016, 25 Pages.
Celko Joe, "Joe Celko's SQL Programming Style", by Elsevier Inc., May, 2005, 237 Pages.
"Poor Man's T-SQL Formatter", Retrieved from «http://architectshack.com/poormanstsqlformatter.ashx», Retrieved on: Apr. 16, 2018, 5 Pages.
Parr, et al., "Towards A Universal Code Formatter Through Machine Learning", In Proceedings of The 2016 ACM Sigplan International Conference on Software Language Engineering, Oct. 31, 2016, pp. 137-151.
"International Search Report and Written Opinion Issued in PCT Application No. PCT/US19/033642", dated Aug. 28, 2019, 11 Pages.

* cited by examiner

```
          ┌─ 305
1 SELECT
2   C1,
3   C2
4 FROM T1
5 JOIN T2 ON
6   T2.I = T1.I
```

```
          ┌─ 310
1 SELECT
2 C1,
3 C2
4 FROM
5 T1
6 JOIN T2 ON
7 T2.I = T1.I
```

```
          ┌─ 315
1 SELECT C1
2       , C2
3 FROM T1
4 JOIN T2 ON T2.I = T1.I
```

```
          ┌─ 320
1 SELECT  C1
2       , C2
3 FROM    T1
4 JOIN    T2
5 ON T2.I = T1.I
```

```
          ┌─ 325
1 SELECT C1,
2        C2
3 FROM T1
4      JOIN T2
5      ON T2.I = T1.I
```

```
          ┌─ 330
1 SELECT C1, C2
2 FROM T1
3   JOIN T2
4     ON (T2.I = T1.I)
```

*FIG. 3*

```
 1  WITH
 2      T1
 3      AS
 4      (
 5              SELECT
 6                  C1
 7              FROM
 8                  T
 9      )
10      ,T2
11      AS
12      (
13              SELECT
14                  SUM(C1) AS S
15              FROM
16                  T1
17      )
18  SELECT
19      COUNT(*)
20  FROM
21      T2
```

*FIG. 5A*

```
   ┌─ 530
1  WITH
2  T1
3  AS
4  (
5  SELECT C1
6  FROM T
7  ),
8  T2
9  AS
10 (
11 SELECT SUM(C1) AS S
12 FROM T1
13 )
14 SELECT COUNT(*)
15 FROM T2
```

535 — brace around lines 5–6
540 — brace around lines 14–15

```
   ┌─ 560
1  WITH T1 AS
2  (
3  SELECT C1
4  FROM T
5  ),
6  T2 AS
7  (
8  SELECT SUM(C1) AS S
9  FROM T1
10 )
11 SELECT COUNT(*)
12 FROM T2
```

*FIG. 5B*

```
 1    IF (MATCHLABEL("SELECTELEMENTS")) THEN
 2        ALIGN(NODE, "SELECT", 2);
 3    ELSE IF (MATCHLABEL("SELECTELEMENT")) THEN
 4        ALIGN(NODE, "SELECTELEMENTS", 0);
 5    ELSE IF (MATCHLABEL("COMMA")) THEN
 6        REPLACE(NODE, "");
 7    ELSE IF (MATCHLABEL("FROM")) THEN
 8        ALIGN(NODE, "SELECT", 0);
 9    ELSE IF (MATCHLABEL("JOIN")) THEN
10        ALIGN(NODE, "FROM", 0);
11    ELSE IF (MATCHLABEL("JOIN_EXPRESSION")) THEN
12        ALIGN(NODE, "JOIN", 2);
```

*FIG. 6*

SQL QUERY FORMATTING BY EXAMPLES

TECHNICAL FIELD

Embodiments described herein generally relate to formatting structured query language (SQL) statements and the technology related to text format processing with artificial intelligence for the purposes of developer preferred format of text and SQL code.

BACKGROUND

Software developers and programmers use different code formatting preferences when writing SQL code. These preferences define how the code is presented (e.g., spaces, indentation, capitalization) or displayed. The presentation may provide different benefits such as improved readability, maintainability, or reduce error-proneness. For a person to manually format the SQL code to their own specification may be very time-consuming.

Code formatting software may be used, but such software requires a developer to specify each format preferences. These options may be overwhelming and occasionally unclear. For example, a code formatting program may offer over 100 formatting options. Furthermore, the software may not offer all the formatting options and styles desired by the developer.

SQL is one of the more challenging languages to create automated solutions for assisting developers to format their code because of the wide range of formatting options, and thus a wide range of format preferences. Research has shown that existing tools are not flexible enough to cover all real-world scenarios of developer preferences for SQL formatting.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates examples of formatting the same SQL query in different ways, according to some embodiments.

FIGS. 5A and 5B illustrate three examples of formatting SQL statements, according to some embodiments.

FIG. 6 illustrates an example code for using conditions and format operations to format a SQL statement, according to some embodiments.

DETAILED DESCRIPTION

Figure 1:
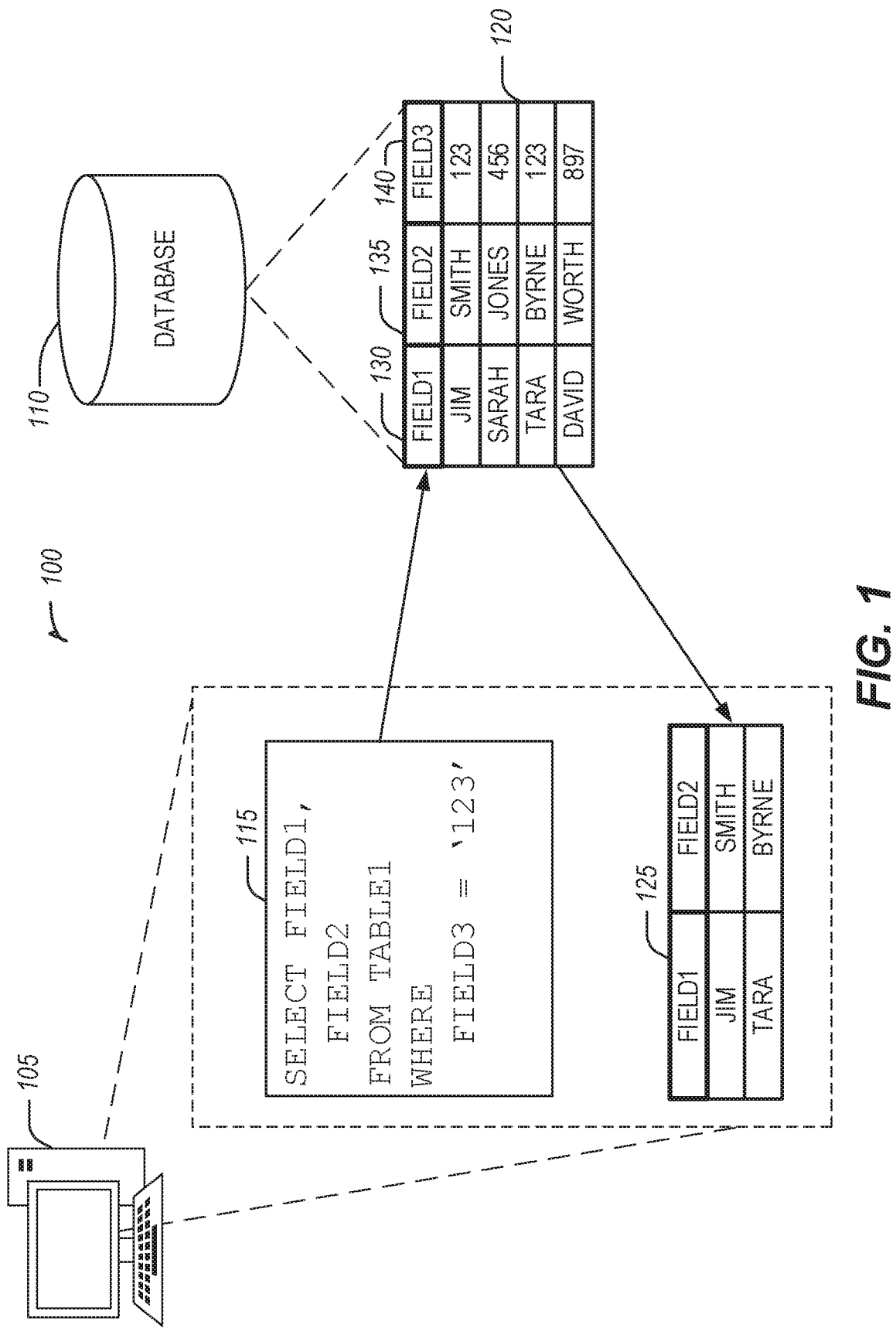
FIG. 1 illustrates an example of SQL in use, according to some embodiments.

For the purposes of the present techniques and configurations described herein, a SQL statement may include multiple parts. As an example, a SQL query statement may be "SELECT first_name, last_name, age FROM table1 WHERE t1=t2". A SQL functional word, such as "SELECT" and "FROM", may be identified as a keyword. Items such as the field names from the SELECT clause or the name of the table may be identified as an element. For example, in the previous FROM clause example, "table1", "t1", and "t2" may be elements. A SELECT clause, such as "SELECT first_name, last_name, age", has field names "first_name", "last_name", and "age", which may be elements. An operator may be a symbolic item, such as the equal sign. Keywords, operators, and elements may be identified as tokens, where a token is essentially each word in a SQL statement, regardless of functionality. A clause, such as a FROM clause, may be a SQL keyword and the elements and keywords that follow the SQL keyword. For example, a FROM clause may be "FROM table WHERE t1=t2".

A SQL statement is a complete and executable set of text comprised of keywords, elements, and operators, that may be recognized as a valid command. SQL statements may be SQL queries (e.g., SELECT commands), which retrieve data from a relational database. Other types of SQL statements may be a SQL update or SQL delete statements which respectively update the data in the database and remove data from the database.

Software developers each develop their own preferences over time for how they prefer code to be formatted and presented. While the specific nuances of how a developer prefers code to be formatted may seem minute and inconsequential, it is an invaluable tool for the developer. By viewing and editing code which is formatted to the developer's preferences, whether code written by the developer or someone else, the developer is able to easily spot errors and make edits without spending extra time to understand the formatting of the code. Understanding the code and reducing errors may lead to reduced resources (e.g., memory, processing time, time) when executing SQL statements.

For example, some SQL developers prefer using a trailing comma after a field name in a series of fields split across multiple lines, while others prefer a leading comma (e.g., the comma is at the beginning of the line). In SQL, when naming a series of fields, such as in a SELECT clause, each field must be separated by a comma, except the last element does not have a comma trailing it. Thus, while some developers prefer the trailing comma technique, as may be used in typical grammatical writing, others prefer the leading comma as it prevents accidentally placing a comma after the last element and resulting in an error when the SQL statement is executed. The leading comma technique is also helpful when editing SQL statements, as the developer may be less likely to remove the last element of the series of elements without also then removing the comma after the new last element.

Some programming languages have little structure and thus allow for many formatting options. SQL code falls into this category, and thus each developer constructs their own formatting preferences as their work with SQL progresses. For example, a SQL query may be written all in one line with no line breaks, such as "select field1, field 2 from table 1". That same SQL query may be written with each element on a new line and with every letter capitalized. Each line of a SQL statement may be indented to the developer's preference, which can become complicated with nested queries.

Existing tools for formatting code may require a developer to spend time going through an overwhelming number of options to customize the formatting to their preferences, yet still may not provide the options for the developer to have the code formatted fully to their ideal format. These tools attempt to provide the developer with a large number of formatting options, but in reality, this is impossible when an infinite number of options exist.

As discussed herein, the present techniques and configurations provide improvements and solutions to the challenges facing current code formatting tools. The present techniques and configurations attempt to remedy the problem of having too many options, and yet at the same time not having the developers desired options for formatting. The present disclosure provides a new approach for formatting code for SQL developers by using the developer's code as input and learning how the developer prefers SQL code to be formatted. This may provide for solutions which may be less time consuming, more customizable, and adaptable over time.

The present disclosure describes a system for learning the formatting preferences for SQL code by training an artificial intelligence model, a formatter model, with one or more sample SQL statements provided by a developer. The present disclosure describes a system for synthesizing SQL formatting from examples using Inductive Programming (IP) and Programming-by-Example (PBE).

The present techniques and configurations may use an inductive programming framework with defined domain specific algorithms for the domain of code formatting. The formatting preferences may be ranked using machine learning. The use of machine learning may provide for better confidence scores in relation to each of the formatting preferences. The confidence provides for correct (in respect to the developer's preferences) formatting in relation to the specific code aspects found in the examples provided by the developer, and to the code aspects not specifically found in the examples.

The present techniques and configurations may be used when a migration is performed. This may include when a first database system is changed to second database system. The SQL statements associated with the first database system may be formatted using the techniques and configurations described herein when migrated to the second database system. A migration may exist when a merger between two organizations occurs. One organization may have different formatting preferences from the second organization. The present techniques and configurations may be used to format the SQL statements according to the format preferences of their destination organization.

FIG. 1 illustrates an example of SQL in use 100, according to some embodiments. A SQL developer may use a computing device 105, such as a computer or a terminal to connect to a database 110. The SQL developer may write a SQL statement 115, such as a query to retrieve data from the database 110. The SQL statement 115 includes indentations, spacing, and line breaks. The database 110 may have multiple tables of data, such as table 120. A table of data, such as table 120, is made up of columns and rows. For example, the table 120 includes three columns, "FIELD1" column 130, "FIELD2" column 135, and "FIELD3" column 140. The columns may indicate a field of data where each row is a separate entry with the fields for that entry are all logically connected. For example, one row of table 120 with the "FIELD 1" column 130 field "JIM" is connected to the "FIELD2" column 135 field "SMITH" and the "FIELD3" column 140 field "123".

The SQL statement 115 may be written to query the database to retrieve data. In the SQL statement 115, a request is made to retrieve data from "TABLE", for entries where "FIELD3" is equal to "123". The SQL statement 115 requests the data for "FIELD 1I" and "FIELD2". When the SQL statement 115 is executed against table 120, the result 125 is returned, such as to the computing device 105. The result 125 includes the data from "FIELD 1" and "FIELD2", but not "FIELD3" as SQL statement 115 did not request the data from "FIELD3". The result 125 includes two entries, which are the two entries from table 120 where "FIELD3" was equal to "123".

The illustrated example 100 is a simple example of querying and retrieving data with a SQL statement 115. A database may be a large collection of data with multiple tables which all relate to each other. The tables may have hundreds of fields with thousands of entries. The combinations of data which may be retrieved from these databases is thus exponentially large. In turn, the SQL statements to query and modify this data may be exponentially complicated. Thus, SQL developers find personal ways to organize the SQL code of their SQL statements to easily read, understand, and modify them.

Figure 2:
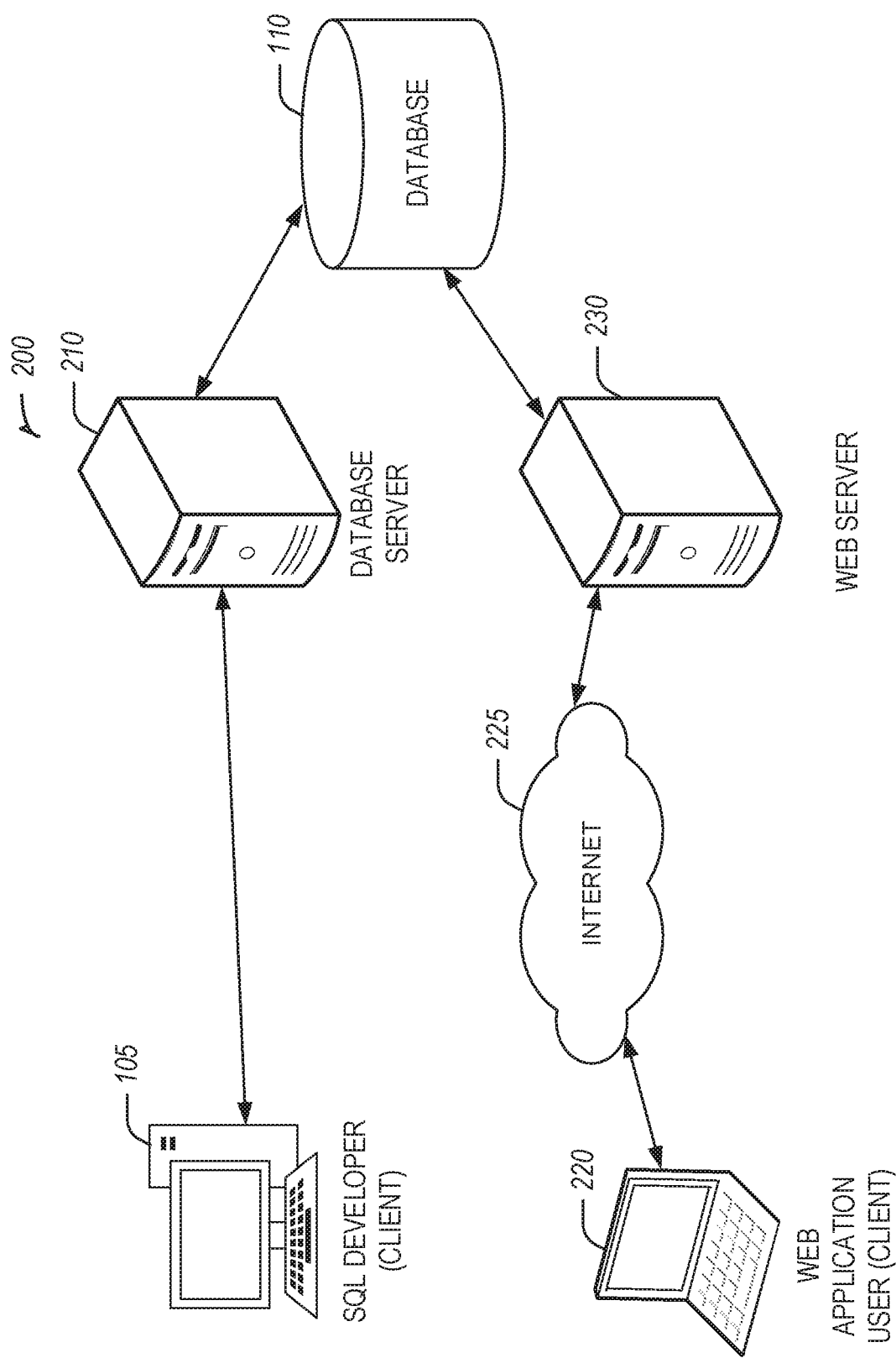
FIG. 2 illustrates an example client and server configuration for interfacing with a database, according to some embodiments.

FIG. 2 illustrates an example client and server configuration 200 for interfacing with a database, according to some embodiments. A SQL developer may write and execute SQL statements on a computing device 105, such as a personal computer or computer terminal. The computing device 105 may interface with a server, such as over a network with a database server 210. The computing device 105 is a client to the database server 210. The database server 210 may be connected to a database 110. The database 110 stores data in an organized manner and may be multiple databases located in multiple locations. The database server 210 may use a database management system (DBMS) to manage and organize the data on the database 110. The computing device 105 may execute a client program of the DBMS which provides for executing SQL statements. The client program transmits the SQL statement to the database server 210 which executes or performs the commands of the SQL statement against the database 110. The database server 210 may then return the results of the SQL statement to the computing device 105, such as the results of a SQL query.

The database server 210 may execute a DBMS for managing and interfacing with the database 110. Multiple types of DBMS software packages exist in the marketplace, each with different types of functionality and SQL formatting specifications. A service provider utilizing a DBMS may decide to change the DBMS package for their services. This may include a migration of the SQL statement files from the old DBMS system to the new DBMS system. The techniques and configurations described herein may be used to automatically update for the formatting of the SQL statements as they are migrated on to the new DBMS system.

The SQL developer may write SQL statements that then become part of an application, such as a web application 220 for retrieving data. For example, shopping web sites and health record systems store data in a database which may be retrieved with SQL queries when a web site user requests a certain set of data. When a user of an online retailer's web site requests to see 48-inch televisions available by the retailer, a SQL query is used to retrieve data for televisions with 48-inch screens from the database for presentation to the user. The web application 220 is another example of a client. The web application 220 may generate a SQL query based on the criteria specified by a user. The SQL query may be transmitted to a web server 230, such as over the internet 225. The web server 230 may be configured to interface with the database 110 and execute the SQL query from the web application 220. The results of the SQL query may then be transmitted back to the web application 220 for presentation to the user.

FIG. 3 illustrates examples of formatting the same SQL query in different ways, according to some embodiments. Developers may have different preferences for formatting each part of the SQL query. In particular, a developer may align the clauses differently. As can be seen in the examples 305-330, although most of the examples 305-325 align the FROM keyword with the SELECT keyword, a developer may add spaces before FROM, such as example 330. There may be various ways to format JOIN and ON keywords as may be seen in example 315 and example 320. Some developers may place the ON keyword on the same line as the JOIN keyword, while other developers may place the ON keyword on a separate line. The joining expression may either follow the ON keyword (example 320, 325) or may be placed on a new line (example 305, 310).

The formatting for the SELECT clause may have variations, such as where the list of elements starts, how the elements align, and where to put the commas. For example, examples 305 and 310 place the elements on a separate line from the SELECT keyword. For an example of alignment, examples 315 and 320 align all the elements the same, but example 325 aligns the elements based on a standard indentation. For an example of comma placement, examples 305 and 310 use a trailing comma, while examples 315 and 320 use a preceding comma.

To determine how a SQL developer prefers their SQL statements formatted, the types of formatting may be identified. SQL formatting may be categorized into types such as: whitespace, line breaks, vertical alignment, indentation, and letter case. A SQL developer may include zero to n whitespaces before a token. The number of whitespaces is the number of whitespace characters which may be placed between two tokens or from the start of a new line to the first token on the line. For example, in FIG. 3, all of the examples have one whitespace character before the =operator. But the white space varies for the table name element (e.g., "T1" and "T2") wherein example 305 the table names have one whitespace, but example 320 the table names have six whitespaces.

A line break or new line indicates the next token should appear on the next line. Before a token, developers may add a line break. For example, in example 325, there is a line break between element C and element C2, but in example 330, C1 and C2 are positioned on the same line.

A SQL developer may, as they are writing the SQL statement, align the current token with respect to a previous token. As seen in example 320, a developer may align the current token with respect to previous elements from different clauses. For example, in example 320, element T1 and element T2 from the FROM and JOIN clauses are vertically aligned with element C 1 and element C2 from the SELECT clause.

Indentation may be the one formatting preference SQL developers differ the most. Indentation may vary based on the number of spaces in the indentation and the vertical alignment. The indentation may vary based on the nested clause or sub clause. After a line break and alignment with a respective previous token, a developer may add an indentation before placing the next token. For example, in example 330, alignment and indentation are used. Each line subsequent line in example 330 is aligned with the previous line, and then indented.

SQL developers may have different preferences with respect to cases for keywords and elements. SQL is not case sensitive, and thus may have any case structure the SQL developer desires. A SQL developer may prefer every token to be upper case or may prefer every token to be lower case. Some SQL developers prefer to distinguish the keywords, and thus keywords are upper case while elements are lower case.

When executing a SQL statement, a SQL compiler parses the SQL statement into a query parse tree. The present techniques and configurations may use a similar parse tree to represent the formatting found in a SQL statement, such as the example SQL statement provided by a developer. This may be referred to as an intermediate representation (IR) tree. The IR tree may be used during the learning and training process for the formatter model. Each node of the tree may have a label (such as a node type), a value, a position (such as a pair of line number and column number for alignment), a list of children nodes, and a reference to the parent node. All nodes may have a label, but only leaf nodes may have a value. Nodes may be a structure node or a sequence node, with a sequence node being either a normal sequence node or a delimited sequence node. A structure node identifies a portion of the SQL statement, such as the SELECT clause or the FROM clause. A sequence node identifies the tokens. A normal sequence node has children with all the same structure. A delimited sequence node has children with even indices which have the same structure and odd indices are the delimiter, such as the elements of a SELECT clause. For each of the leaf nodes of the IR tree which corresponds to a token, there is a linked format node, which may define the whitespace, line breaks, and indentation for the token of the leaf node.

Figure 4:
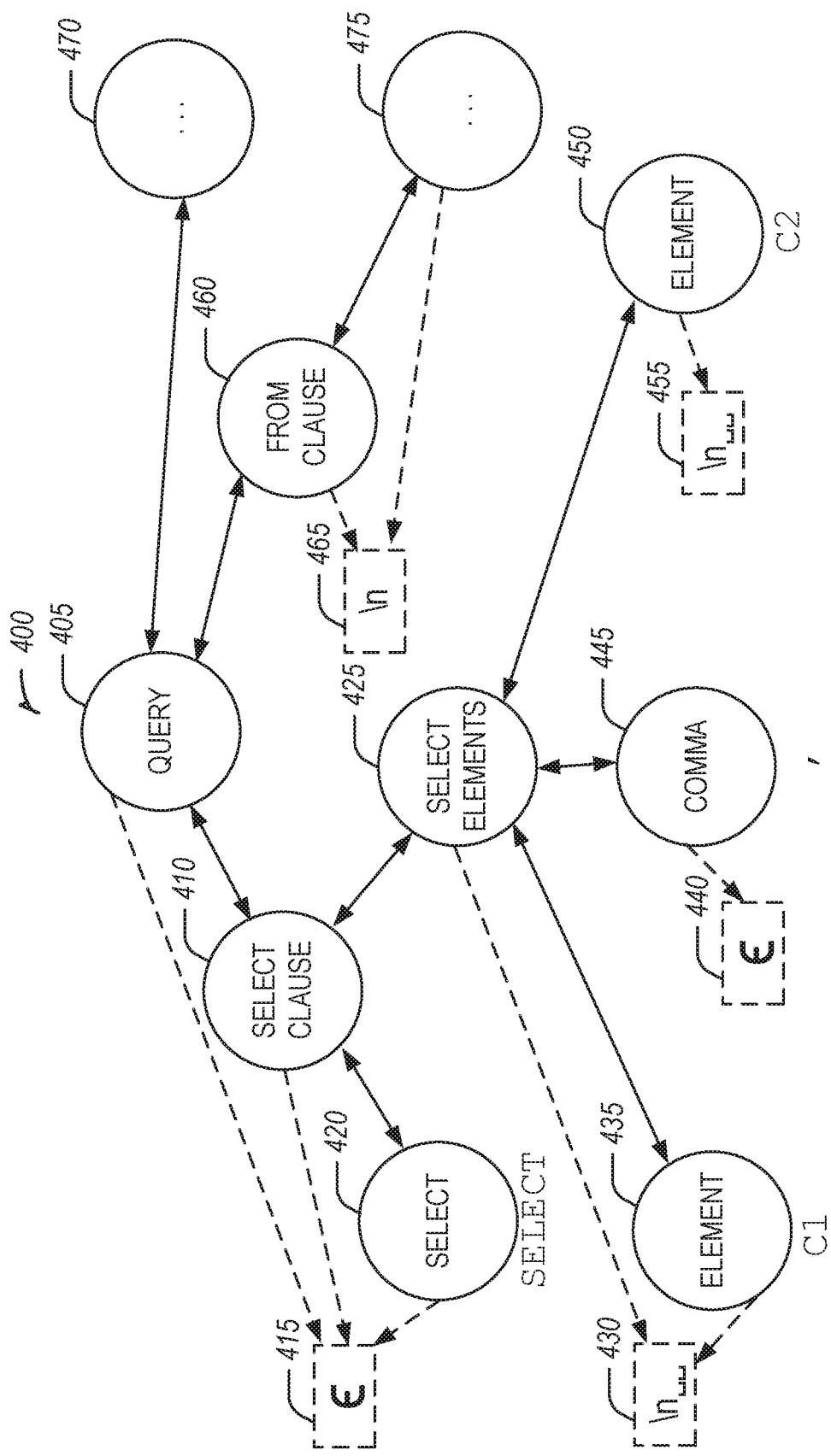
FIG. 4 illustrates a partial example intermediate representation (IR) tree constructed from a SQL statement, according to some embodiments.

FIG. 4 illustrates a partial example IR tree 400 constructed from a SQL statement, according to some embodiments. The IR tree 400 is based on the SQL statement from example 305 in FIG. 3. To format a SQL statement, the formatter model may change the white space for each of the tokens. Thus, for each leaf node which corresponds to a token, there is a linked format node with the white space value. The format node is designated by a dashed rectangle in IR tree 400, such as format node 430.

Separate IR trees may be constructed based on the type of SQL statement, such as for a query or an update. The root node 405 identifies the IR tree as a query. The children of the root node 405 are the clauses which may comprise a SQL query, such as the select clause node 410 and the from clause node 460. As noted, IR Tree 400 is a partial formatting representation. Thus, root node 405 may have additional children nodes, such as the join clause, represented by node 470. A clause node may have children nodes which include keyword nodes and element nodes. The select clause node 410 has a keyword node of the select node 420 and an element node of select elements node 425, which is a delimited sequence node. The select elements node 425 has children nodes which are the elements of the sequence. The elements include elements node 435, comma node 445, and element node 450. While example 305 only has two elements in the select clause, if a SQL statement had more than two elements, nodes 435, 445, and 450 may be sufficient to represent the select elements as the sequence the nodes represent would be repeated.

Format nodes may be applied to structure nodes, such as the from clause node 460, and applied to keyword or element nodes, such as element node 450. For example, the FROM clause in example 305 begins with a line break, thus the from clause node 460 has a corresponding format node 465 indicating a new line. Some nodes do not have any formatting, such as the select node 420. The select node 420 has a corresponding format node 415 that indicates the format is the empty set, and thus no formatting.

For the sequence elements, from example 305, the first element "C 1" is on a separate line from the SELECT keyword, followed by a comma with no spaces or line breaks. The second element "C2" is on a separate line from "C1" and the comma. Both "C1" and "C2" are indented two spaces. This is represented in the IR tree 400 under the select elements node 425. The first element node 435 has corresponding format node 430 which instructs to place the element on a new line and apply two spaces (the indentation) before the element. For the comma node 445, the corresponding format node 440 is the empty set. Thus, the comma should immediately follow the element, with no spaces or line breaks. Then the next element node 450 has corresponding format node 455, which also indicates a new line and two spaces. Thus, the format for the elements is following a comma, a new line and two spaces should be placed before the next element.

Using this IR tree structure, the present techniques and configurations convert the query parse tree to an IR tree. A structure node from the query parse tree may be converted to a structure node of the IR tree, such as the from clause node 460. For a recursive node of the query parse tree, the recursive node's descendants are flattened and converted to a sequence node, such as the select elements node 425 and its children. As the IR tree is focused on formatting, and the list of children may have the same formatting structure, the recursive node of the query parse tree may be simplified to a sequence node for the IR tree. Differing from the query parse tree, the IR tree includes format nodes, which include a white space value. For each leaf node that corresponds to a token, a format node is linked to it.

From an example SQL statement provided by the SQL developer, the present techniques and configurations may parse the SQL statement into an IR tree. The IR tree may be used to train the formatter model and determine a set of format rules. To determine the formatting rules, the same example SQL statement is parsed into another IR tree, but with all the format nodes replaced with a single space, resulting in a normalized IR tree. If the SQL statement from the normalized IR tree was reproduced, it may be a normalized SQL statement, formatted as "SELECT C1, C2 FROM T1 JOIN T2 ON T2.I=T1.I", where each token (including commas and operators) are separated by a space. The IR tree and the normalized IR tree are then traversed together in pre-order traversal, with any differences used to generate a format rule.

By determining the format rules based on the normalized SQL statement, the rules may then be applied in the same way to any SQL statement by first normalizing the SQL statement. Part of how a SQL developer prefers their formatting may be based on the overall structure of the SQL statement. For example, the position of the FROM keyword may be based on the position of the SELECT keyword. By determining the rules based on the normalized SQL statement, those rules may then be applied in the same way to a new SQL statement, by first normalizing the new SQL statement.

The format rules, or format definitions, may comprise conditions and format operations. A condition is a conjunction of predicates, each of which matches a property of the node. A node may be matched to a token based on internal properties such as the node's label or value, or a portion of the label or value. Further definitions may be necessary to fully capture the formatting of the token for its given context, such as how the node relates to its parent and siblings.

For example, a predicate may determine if the node's label matches a given label, a node's parent label matches a given label, or a node's sibling label matches a given label. A predicate may determine if the node's value matches a given value. The predicate match may not be exact, but may determine if the label and the given label have a correspondence or matches a portion of the label or value. For example, the predicate may match on any node that includes "element", such as "select element" and "join element." A predicate may be used to determine if the node is a keyword. A predicate may be used to determine if the node is the first element in a sequence node.

Based on the conditions determined, a format operation may be performed. The present techniques and configurations may include a format operation to replace the text of the format node with a string value. The present techniques and configurations may include a format operation to change the case of a node's value. The present techniques and configurations may include a format operation to align the current node with the nearest prior sibling or predecessor. The present techniques and configurations may include a format operation to indent spaces before an aligned node.

The IR tree and the normalized IR tree are traversed together in pre-order tree traversal to determine formatting differences. Each difference may then be used to train the formatting model. First the predicate is learned. A difference may only be at a leaf node (such as a value case difference) or at a format node (such as a formatting difference indicating a new line). If the difference is at a leaf node, a predicate is generated to match the node. When the difference is at the format node, the predicate is generated to match the node corresponding to the format node (such as the following leaf node and the leaf-most ancestors connected to the format node). A predicate may match the label or value of a node, or a portion of the label or value of the node.

The following algorithm is a possible learning algorithm for traversing the IR tree and the normalized IR tree and determining the differences to learn the formatting preferences.

```
Algorithm 1: Learn a program from an example
1     function Program Synthesize (Query q):
2        begin
3           P̃ = ∅
4           tree := CreateTree (q)
5           normTree := Normalize(tree)
6           foreach d ∈ Diff (tree, normTree) do
7              ⟨ c̃, s̃s ⟩ := Learne(d)
8              Q̃ := {⟨ c̃ᵢ, s̃sᵢ, dᵢ ⟩ ∈ P̃ s.t. c̃ᵢ ∪ c̃ ≠ ∅}
9              if Q̃ = ∅ then
                   */ New rules */
10                 P̃ := P̃ ∪ ⟨ c̃, s̃s, d ⟩
11              else if (c̃' := c̃\∪_(c̃ᵢ,...)∈Q̃ cᵢ ) ≠ ∅ then
                   /* Overlapping rules */
12                 P̃ := P̃ ∪⟨ c̃', s̃s, d ⟩
13              else
14                 let ⟨ c̃ᵢ, s̃s, dᵢ ⟩ ∈ P̃ s.t. c̃ ⊑ c̃ᵢ
                   /* Subsumed/conflicting rules */
15                 if dᵢ ≠ d then
16                    P̃ := ResolveConflict(P̃, ⟨ c̃, s̃s, d ⟩ )
17        return Top(P̃)
```

From the example algorithm, line 4 creates a tree for the example query q that preserves all formatting whitespaces. Line 5 normalizes tree by replacing all of the formatting nodes with a single space. The Diff function in line 6 returns the differences between the two trees. For the initial learning, the structures of the two trees are the same (the two trees only differ on the values of the formatting nodes and the case of keyword nodes). Thus, the Diff function simply traverses the two trees in parallel and records the differences. The loop iterates over these differences to learn the rules. At each change d, the set of all possible conditions c̃ and the set of all possible statement sequences s̃s (line 7) are learned. This tuple is a program set. Each combination of the tuple elements corresponds to a rule that may construct d. The program set for d (i.e., the tuple (c̃, s̃s)) is then merged to the existing program sets P̃.

Three cases may exist for merging the program set. First, the case where the new program set does not overlap with P̃ (lines 9-10), which occurs when the new predicate set c does not overlap with any of the existing predicates in P̃. For this case the new program set is merged with P̃ (line 10).

The second case is where the new program set partially overlaps with P̃ (lines 11-12). The portion of the new program set that is not covered by existing program sets may be merged.

The third case is where the new program set is entirely covered by a program set in P̃ (lines 14-16). If the change d differs from that of the covered program set, the conflicts between the new program set and the existing program sets are resolved (line 16). Otherwise, the new program set is ignored because it is subsumed by the existing ones.

Finally, the algorithm returns the top program from P̃ (line 17). This operation retrieves the top predicate and statement sequence in each of the rule's program set in P̃.

The formatting model is trained with a statement, or format operation, corresponding to the format of the determined formatting difference. A statement to change the case of the token may be generated when the formatting difference is a difference in case. An alignment statement may be generated when a line break difference is determined for a node. The alignment statement is used to place the token of the node at the proper indentation point after the line break. To train for an alignment, an anchor node is located and the indentation with respect to the anchor node is determined. The anchor node is used for alignment of the node. For example, a FROM keyword may be aligned with the SELECT keyword. By aligning the FROM keyword with the SELECT keyword, instead of a static indentation, if the SELECT keyword is part of a sub-clause, then the FROM keyword indentation with correspond with the indentation of the SELECT keyword as part of the sub-clause.

The anchor node may be any of the prior nodes (in a pre-order traversal), but the anchor may be restricted to the node's left-most sibling, the node's ancestors, or the node's ancestors' left-most siblings. These nodes may typically be the start of substructures or clauses. For each of the possible anchors, the indentation is calculated using the anchor's position and the whitespaces in the difference.

FIGS. 5A and 5B illustrate three examples of formatting SQL statements, according to some embodiments. The formatting of the example SQL statements illustrates a complexity in formatting where similar tokens are formatted differently depending on the context. For example, the parentheses for the AS expression and the parenthesis for the SUM and COUNT expression have different formatting. The AS keyword is also formatted differently. The AS clause 510, demonstrates for the format used for example 505, when the AS keyword is followed by a parenthesis, the AS keyword and parenthesis are separated by a line break. The SUM clause 515 includes the AS keyword, however, as the next token is not a parenthesis, a line break does not separate the two tokens.

The examples 505, 530, and 560 illustrate additional formatting preferences SQL developers may have for the same underlying SQL statement. For example, the format of example 505 separates almost every token with a line break and uses four space indentations. Example 530 keeps the tokens of the SELECT clauses on the same line, breaking at the FROM keyword. Example 530 uses two space indentations, with the FROM keyword indented from the SELECT keyword. Example 560 uses two space indentations, but the FROM keyword is aligned with the SELECT keyword.

In example 530, SELECT clause 535 and SELECT clause 540 provide an example of maintaining formatting through the use of an anchor. In SELECT clause 535, the positioning of the FROM keyword may be defined by its alignment with an anchor, such as the SELECT keyword. Thus, for SELECT clause 535, while the SELECT keyword is indented two spaces and the FROM keyword is indented four spaces, the format definition for the FROM keyword may be to align with the SELECT keyword with an additional two spaces. This alignment corresponds with SELECT clause 540, as the FROM keyword is only indented two spaces from the alignment of the SELECT keyword, instead of four spaces had the indentation been based simply on the number of indented spaces from the first FROM keyword in example 530.

FIG. 6 illustrates an example code 600 for using conditions and format operations to format a SQL statement, according to some embodiments. The formatting in example code 600 corresponds to the formatting provided in example 305 of FIG. 3. Clause 605 puts the select element list into a new line and aligns the list with the root with 2-space indentation. Clause 610 aligns the elements in the select list with each other. Clause 615 removes any spaces before a comma from the normalized statement. If different comma formatting is needed, the context may be determined by using other predicates, such as matching to the parent label. Clause 620 aligns the FROM clause with the SELECT clause. Clause 625 aligns the JOIN clause with the FROM clause. Clause 630 aligns the JOIN expression (the fields from each table which correspond) with the JOIN clause and indents two spaces.

Additional example SQL statements may be provided by the SQL developer to refine the format model. The presently described techniques and configurations store or generate an IR tree based on the current set of format rules. An additional example SQL statement may be parsed into an IR tree. Similar to the first provided example SQL statement, a difference traversal is performed with the IR tree of the additional example SQL statement against the IR tree of the current set of format rules. At each difference, the model learns the format rule associated with the difference and generates a condition and format operation.

When an additional example SQL statement is provided, the additional example SQL statement may include formatting conforming to the SQL developer's previously provided examples. For example, if the original example SQL statement has the FROM keyword aligned with the SELECT keyword, and this alignment is present in the additional example SQL statement, then there is no formatting difference and the rule for FROM keyword alignment remains the same.

The additional example SQL statement may have new formatting preferences which were not present in the original example SQL statement. For example, the additional example SQL statement may include the COUNT keyword, which was not present in the original example SQL statement. The IR tree difference traversal may indicate this difference and thus generate a formatting rule for the COUNT keyword based on the formatting present in the additional example SQL statement.

The additional example SQL statement may include formatting preferences which conflict with previous formatting preferences. For example, the original example SQL statement may demonstrate a preference for aligning the FROM keyword with the SELECT keyword. But the additional example SQL statement may demonstrate a preference for indenting the FROM keyword by two spaces from the alignment of the SELECT keyword. Conflicts may be resolved by splitting the context. This may be accomplished by constraining the conditions to more narrowly capture the format context. For example, a SQL developer may format the SELECT element list in the main query differently than that in a subquery. An additional predicate may be used to split the context into smaller contexts (e.g., main query and subquery).

Conflicts may exist where the context may be exactly the same and thus cannot be split. For example, a SQL developer may provide example SQL statements with conflicting examples on how to format the SELECT element list in the main query. In such cases, a majority-vote selection may be used to choose the format that appears most often in the examples. In the case of a tie, the formatting most similar to the formatting for other constructs may be chosen.

When performing a formatting execution against a SQL statement, a keyword or construct may be present in the SQL statement which has previously not been a part of the examples provided by the SQL developer and thus a formatting preference does not exist. For example, the SQL statement to be formatted may include the COUNT keyword, but the previously provided examples have not included the COUNT keyword. The presently described techniques and configurations may use a form of generalization when an undefined token or construct is identified in execution. A hierarchical structure may be used for inheriting the preferences. If a format definition is not found for a token or construct, thus an undefined token or construct, the system determines a format for the undefined token or construct with a format of a related format defined token or constructs. For example, the system may infer the format of a WHERE keyword and GROUP BY keyword using the format preferences for the SELECT keyword and FROM keyword. A default format preference may be defined to be used for all undefined keywords or constructs.

Figure 7:
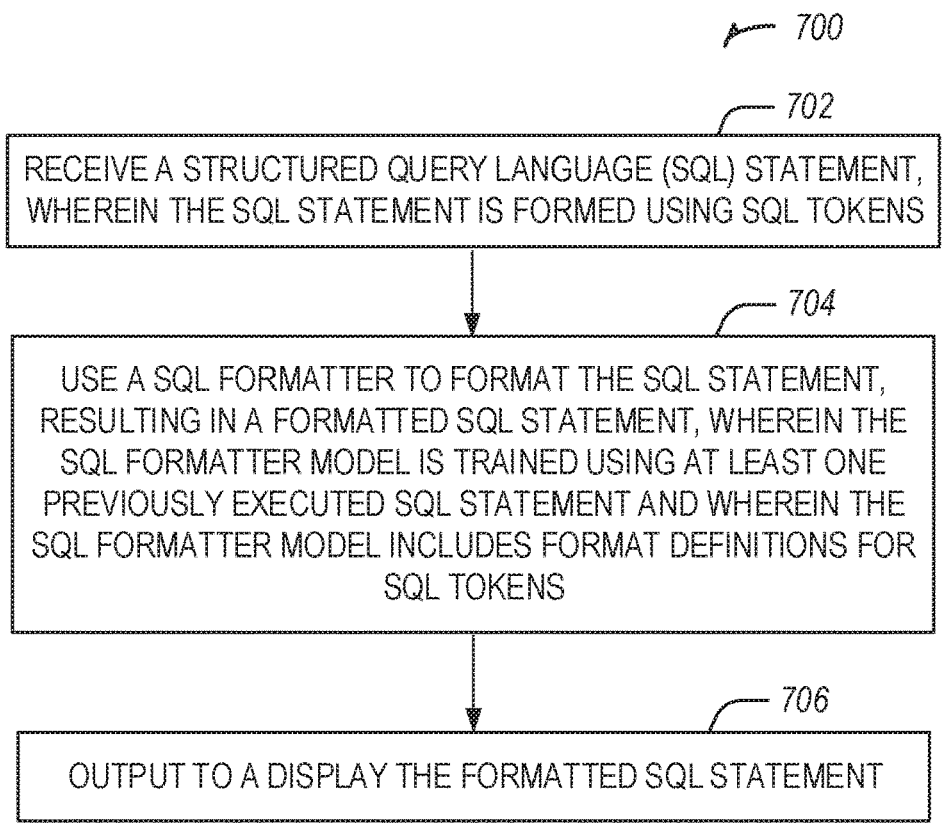
FIG. 7 illustrates a flowchart showing a technique for formatting a SQL statement with a trained SQL formatter model, according to some embodiments.

FIG. 7 illustrates a flowchart showing a technique 700 for formatting a SQL statement with a trained SQL formatter model, according to some embodiments. The technique 700 includes an operation 702 to receive a SQL statement. A SQL statement may be any type of SQL command, such as a query, an update, or a deletion. The SQL statement is formed using SQL tokens. A SQL token may be a SQL keyword, an element such as a field name, or an operator. The combination of SQL tokens to form the SQL statement create an executable SQL statement.

The received SQL statement may be a SQL statement received from another SQL developer or may be part of a migration of SQL statements from one system to another. The SQL statement may be parsed and normalized. The normalization removes all formatting present in the received SQL statement and replaces the formatting for the token with a single space. The normalized SQL statement is a single line of tokens, each separated by a single space. The normalization creates a standard baseline format for input to the SQL formatter model. This may prevent any possible incorrect formatting based on attempting to compensate for the formatting already present in the received SQL statement.

The technique 700 includes an operation 704 to use a SQL formatter model to format the SQL statement, resulting in a formatted SQL statement. The trained SQL formatter model may be trained using at least one previously executed SQL statement. The previously executed SQL statement may be a SQL statement written by a SQL developer using their preferred formatting, for execution such as for a web application or software package. The previously executed SQL statement may not be a SQL statement specifically written for training the formatting model. The trained SQL formatter model may include format definitions for SQL tokens. A format definition may be a combination of one or more conditions and format operations which define how a format should be applied to a token. The SQL tokens may be SQL keywords and elements which form a SQL statement. For example, "SELECT" is a SQL keyword, and the identifications of fields following the SELECT keyword are elements. The format defined SQL token includes a SQL token and a corresponding format definition. For example, a format defined SQL token may be the SQL keyword FROM with a format definition to align the FROM keyword with the SELECT keyword.

The technique 700 may further include identifying, as a format undefined SQL token, a SQL token in the SQL statement for which a respective format definition does not exist in the SQL formatter model. The SQL formatter model may use the format definition of a format defined SQL token for a format undefined SQL token. If the SQL statement includes a SQL keyword for which there is no format definition, the trained SQL formatter model may use a format definition from a similar SQL keyword. For example, if the trained SQL formatter model does not include a format definition for the COUNT keyword, the trained SQL formatter model may use the format definition associated with the SUM keyword.

The format definition may include a capitalization definition for the SQL token. The capitalization definition may define the SQL token to be in all uppercase letters. The capitalization definition may define the SQL token to be in all lowercase letters. The capitalization definition may define the SQL token to be a combination of uppercase and lowercase letters, such as the first letter of the SQL token being uppercase and the remaining letters lowercase.

The format definition may include a whitespace, line break, alignment, and indentation definition for the SQL token. The format definition may include a white space definition, such as the number of spaces between the token and the previous token. The format definition may include a line break definition, such as if one or more line breaks should occur before the token. The format definition may include an alignment definition, such as a previous token for the current token to be aligned with. The alignment definition may be useful when a token is part of a sub clause which may be indented. The alignment provides for successive tokens to follow the same indentation of their predecessors, such as a FROM keyword following a SELECT keyword. The format definition may include an indentation definition, such as if the token should be indented a determined number of spaces. The indentation definition may be used with the alignment definition. The technique 700 includes an operation 706 to output to a display the formatted SQL statement.

The technique 700 may further include operations to train the trained SQL formatter model. The trained SQL formatter model may be trained with an example SQL statement. The training may be performed by providing an example SQL statement, formatted by a developer in their preferred formatting manner. This may include uses of line breaks, indentations, spacing, and capitalization of SQL tokens.

The training may include parsing the example SQL statement into a set of SQL tokens. For example, the training may include parsing the example SQL statement into an IR tree, including the SQL tokens and formatting of those tokens found in the example SQL statement. The example SQL statement may be normalized and parsed into a normalized IR tree. The IR tree and normalized IR tree may be traversed, such as with a pre-order traversal, to determine the formatting preferences. Algorithm 1 may be an example process for the identification and determination of the formatting preferences. The training may include identifying a format definition corresponding to each SQL token. For example, the formatting corresponding to the JOIN keyword may be a line break. The SQL formatter model may be trained to format SQL statements using the set of SQL tokens and the format definitions corresponding to each SQL token.

The training of the SQL formatter model may further include identifying a format conflict based on the example SQL statement including at least two of the same SQL tokens wherein the format definition corresponding to the at least two of the same SQL tokens differ. The training of the SQL formatter model may include resolving the conflict by selecting a format definition for training the SQL formatter model from the at least two format definitions corresponding to the at least two of the same SQL tokens. The selection of the format definition from the at least two format definitions may be selected based on the most frequently occurring format definition of the at least two format definitions corresponding to the at least two of the same SQL tokens. For example, if the example SQL statement includes three ON keywords (as part of a JOIN clause), where two of the ON keywords are on the same line as the JOIN keyword, but the third is on a new line separate from the JOIN keyword, then a conflict may exist for which format the SQL developer prefers for the ON keyword. Based on the same line format appearing twice and the new line format appearing only once, the same line format may be selected to resolve the conflict.

Figure 8:
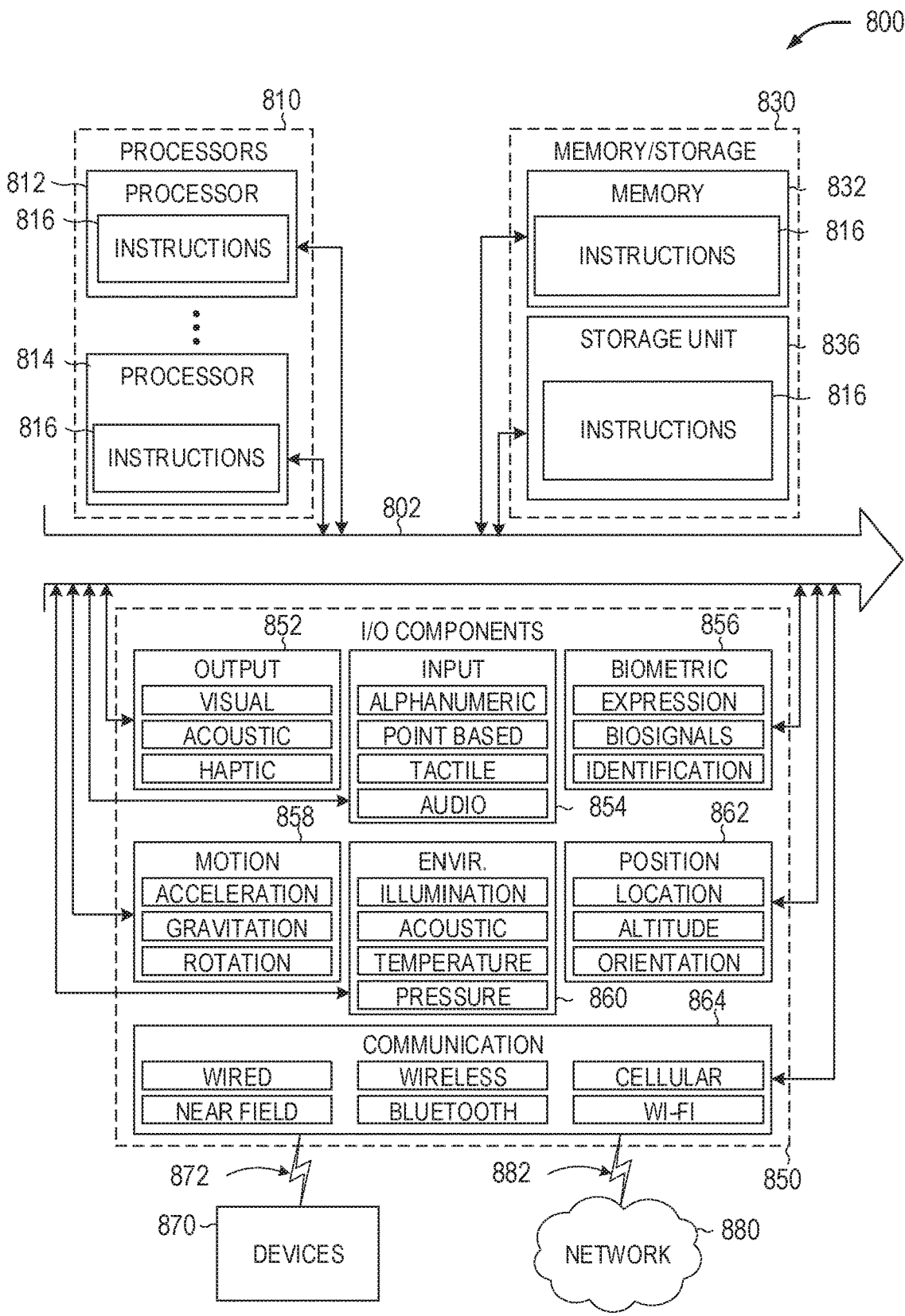
FIG. 8 is a block diagram illustrating an example of a machine upon which one or more embodiments may be implemented.

FIG. 8 is a block diagram illustrating components of a machine 800 which according to some example embodiments is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. The instructions 816 transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions (e.g., instructions 816) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. For example, in addition to a speaker, the output components 852 may include a visual output device adapted to provide augmented visual colors, animations, and presentation of information that is determined to best communicate and improve the user's mood to an optimal state as described herein. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio-signals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components, or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

In various example embodiments, one or more portions of the network 880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Example 1 is a method for formatting a structured query language (SQL) statement, comprising: receiving a SQL statement, such that the SQL statement is formed using SQL tokens; using a SQL formatter model to format the SQL statement, resulting in a formatted SQL statement, such that the SQL formatter model is trained using at least one previously executed SQL statement and such that the SQL formatter model includes format definitions for SQL tokens; and outputting the formatted SQL statement.

In Example 2, the subject matter of Example 1 includes using the SQL formatter model to apply respective format definitions to the SQL tokens in the SQL statement, resulting in format defined SQL tokens for the SQL statement.

In Example 3, the subject matter of Example 2 includes identifying, as a format undefined SQL token, a SQL token in the SQL statement for which a respective format definition does not exist in the SQL formatter model; using the format definition of a format defined SQL token for the format undefined SQL token.

In Example 4, the subject matter of Examples 1-3 includes format definitions for SQL tokens including a capitalization definition.

In Example 5, the subject matter of Examples 1-4 includes format definitions for the SQL tokens that includes at least one of a whitespace, a line break, an alignment, or an indentation definition.

In Example 6, the subject matter of Examples 1-5 includes, such that the SQL formatter model is trained with an example SQL statement, the training including: parsing the example SQL statement into a set of SQL tokens; identifying a respective format corresponding to each SQL token; and training the SQL formatter model to format SQL statements using the set of SQL tokens, and the respective format corresponding to each SQL token.

In Example 7, the subject matter of Example 6 includes, identifying a format conflict based on the example SQL statement including at least two of the same SQL tokens with different formats; and selecting a format for the trained SQL formatter model from the at least two format definitions corresponding to the at least two of the same SQL tokens.

In Example 8, the subject matter of Example 7 includes, such that the format definition is selected based on the most frequently occurring format definition of the at least two format definitions corresponding to the at least two of the same SQL tokens.

Example 9 is a system for formatting a structured query language (SQL) statement, comprising: at least one processor; and memory including instructions that, when executed by the at least one processor, cause the at least one processor to: receive a SQL statement, wherein the SQL statement is formed using SQL tokens; use a SQL formatter model to format the SQL statement, resulting in a formatted SQL statement, wherein the SQL formatter model is trained using at least one previously executed SQL statement and wherein the SQL formatter model includes, format definitions for SQL tokens; and output the formatted SQL statement.

In Example 10, the subject matter of Example 9 includes using the SQL formatter model by applying respective format definitions to the SQL tokens in the SQL statement, resulting in format defined SQL tokens for the SQL statement.

In Example 11, the subject matter of Example 10 includes, instructions to: identify, as a format undefined SQL token, a SQL token in the SQL statement for which a respective format definition does not exist in the SQL formatter model; use the format definition of a format defined SQL token for the format undefined SQL token.

In Example 12, the subject matter of Examples 9-11 includes, such that the format definitions for the SQL tokens include at least one of a whitespace, a line break, an alignment, or an indentation definition.

In Example 13, the subject matter of Examples 9-12 includes, such that the SQL formatter model is trained with an example SQL statement, the training including instructions to: parse the example SQL statement into a set of SQL tokens; identify a respective format corresponding to each SQL token; and train the SQL formatter model to format SQL statements using the set of SQL tokens, and the respective format corresponding to each SQL token.

In Example 14, the subject matter of Example 13 includes, instructions to: identify a format conflict based on the example SQL statement including at least two of the same SQL tokens with different formats; and select a format for the trained SQL formatter model from the at least two format definitions corresponding to the at least two of the same SQL tokens.

Example 15 is at least one non-transitory computer readable medium including instructions for formatting a structured query language (SQL) statement that when executed by at least one processor, cause the at least one processor to: receive a SQL statement, wherein the SQL statement is formed using SQL tokens; use a SQL formatter model to format the SQL statement, resulting in a formatted SQL statement, wherein the SQL formatter model is trained using at least one previously executed SQL statement and wherein the SQL formatter model includes, format definitions for SQL tokens; and output the formatted SQL statement.

In Example 16, the subject matter of Example 15 includes, wherein using the SQL formatter model includes applying respective format definitions to the SQL tokens in the SQL statement, resulting in format defined SQL tokens for the SQL statement.

In Example 17, the subject matter of Example 16 includes, instructions to: identify, as a format undefined SQL token, a SQL token in the SQL statement for which a respective format definition does not exist in the SQL formatter model; use the format definition of a format defined SQL token for the format undefined SQL token.

In Example 18, the subject matter of Examples 15-17 includes, such that the format definitions for the SQL tokens include at least one of a whitespace, a line break, an alignment, or an indentation definition.

In Example 19, the subject matter of Examples 15-18 includes, such as the SQL formatter model is trained with an example SQL statement, the training including instructions to: parse the example SQL statement into a set of SQL tokens; identify a respective format corresponding to each SQL token; and train the SQL formatter model to format SQL statements using the set of SQL tokens, and the respective format corresponding to each SQL token.

In Example 20, the subject matter of Example 19 includes, instructions to: identify a format conflict based on the example SQL statement including at least two of the same SQL tokens with different formats; and select a format for the trained SQL formatter model from the at least two format definitions corresponding to the at least two of the same SQL tokens.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A computer-implemented method for formatting a structured query language (SQL) statement, comprising:
    parsing a previously executed SQL statement into a format tree, including format indications for each token in the previously executed SQL statement,
    parsing the previously executed SQL statement into a normalized tree;
    comparing the format tree and normalized tree to identify a difference set of format indications;
    receiving, at a computing device, a SQL statement, wherein the SQL statement is formed using SQL tokens;
    using a SQL formatter model to format the SQL statement, resulting in a formatted SQL statement, wherein the SQL formatter model is trained using the difference set from the previously executed SQL statement and wherein the SQL formatter model includes format definitions for SQL tokens; and
    outputting, to a display, the formatted SQL statement.

2. The computer-implemented method of claim 1, wherein using the SQL formatter model includes applying respective format definitions to the SQL tokens in the SQL statement, resulting in format defined SQL tokens for the SQL statement.

3. The computer-implemented method of claim 2, further comprising:
    identifying, as a format undefined SQL token, a SQL token in the SQL statement for which a respective format definition does not exist in the SQL formatter model;
    using the format definition of a format defined SQL token for the format undefined SQL token.

4. The computer-implemented method of claim 1, wherein the format definitions for SQL tokens include a capitalization definition.

5. The computer-implemented method of claim 1, wherein the format definitions for the SQL tokens include at least one of a whitespace, a line break, an alignment, or an indentation definition.

6. The computer-implemented method of claim 1, wherein the SQL formatter model is trained with an example SQL statement, the training including:
    parsing the example SQL statement into a set of SQL tokens;
    identifying a respective format corresponding to each SQL token; and
    training the SQL formatter model to format SQL statements using the set of SQL tokens, and the respective format corresponding to each SQL token.

7. The computer-implemented method of claim 6, further comprising:

identifying a format conflict based on the example SQL statement including at least two of the same SQL tokens with different formats; and selecting a format for the trained SQL formatter model from at least two format definitions corresponding to the at least two of the same SQL tokens.

8. The computer-implemented method of claim 7, wherein the format definition is selected based on a most frequently occurring format definition of the at least two format definitions corresponding to the at least two of the same SQL tokens.

9. A system for formatting a structured query language (SQL) statement, comprising:
at least one processor; and
memory including instructions that, when executed by the at least one processor, cause the at least one processor to:
parse a previously executed SQL statement into a format tree, including format indications for each token in the previously executed SQL statement;
parse the previously executed SQL statement into a normalized tree;
compare the format tree and normalized tree to identify a difference set of format indications;
receive a SQL statement, wherein the SQL statement is formed using SQL tokens;
use a SQL formatter model to format the SQL statement, resulting in a formatted SQL statement, wherein the SQL formatter model is trained using the difference set from the previously executed SQL statement and wherein the SQL formatter model includes format definitions for SQL tokens; and
output, to a display, the formatted SQL statement.

10. The system of claim 9, wherein using the SQL formatter model includes applying respective format definitions to the SQL tokens in the SQL statement, resulting in format defined SQL tokens for the SQL statement.

11. The system of claim 10, further comprising instructions to:
identify, as a format undefined SQL token, a SQL token in the SQL statement for which a respective format definition does not exist in the SQL formatter model;
use the format definition of a format defined SQL token for the format undefined SQL token.

12. The system of claim 9, wherein the format definitions for the SQL tokens include at least one of a whitespace, a line break, an alignment, or an indentation definition.

13. The system of claim 9, wherein the SQL formatter model is trained with an example SQL statement, the training including instructions to:
parse the example SQL statement into a set of SQL tokens;
identify a respective format corresponding to each SQL token; and
train the SQL formatter model to format SQL statements using the set of SQL tokens, and the respective format corresponding to each SQL token.

14. The system of claim 13, further comprising instructions to:
identify a format conflict based on the example SQL statement including at least two of the same SQL tokens with different formats; and select a format for the trained SQL formatter model from the at least two format definitions corresponding to the at least two of the same SQL tokens.

15. At least one non-transitory computer readable medium including instructions for formatting a structured query language (SQL) statement that when executed by at least one processor, cause the at least one processor to:
parse a previously executed SQL statement into a format tree, including format indications for each token in the previously executed SQL statement;
parse the previously executed SQL statement into a normalized tree;
compare the format tree and normalized tree to identify a difference set of format indications;
receive a SQL statement, wherein the SQL statement is formed using SQL tokens;
use a SQL formatter model to format the SQL statement, resulting in a formatted SQL statement, wherein the SQL formatter model is trained using the difference set from the previously executed SQL statement and wherein the SQL formatter model includes format definitions for SQL tokens; and
output, to a display, the formatted SQL statement.

16. The at least one computer readable medium claim 15, wherein using the SQL formatter model includes applying respective format definitions to the SQL tokens in the SQL statement, resulting in format defined SQL tokens for the SQL statement.

17. The at least one computer readable medium of claim 16, further comprising instructions to:
identify, as a format undefined SQL token, a SQL token in the SQL statement for which a respective format definition does not exist in the SQL formatter model;
use the format definition of a format defined SQL token for the format undefined SQL token.

18. The at least one computer readable medium of claim 15, wherein the format definitions for the SQL tokens include at least one of a whitespace, a line break, an alignment, or an indentation definition.

19. The at least one computer readable medium of claim 15, wherein the SQL formatter model is trained with an example SQL statement, the training including instructions to:
parse the example SQL statement into a set of SQL tokens;
identify a respective format corresponding to each SQL token; and
train the SQL formatter model to format SQL statements using the set of SQL tokens, and the respective format corresponding to each SQL token.

20. The at least one computer readable medium of claim 19, further comprising instructions to:
identify a format conflict based on the example SQL statement including at least two of the same SQL tokens with different formats; and
select a format for the trained SQL formatter model from the at least two format definitions corresponding to the at least two of the same SQL tokens.

* * * * *